United States Patent [19]

Coulter et al.

[11] 3,836,849

[45] Sept. 17, 1974

[54] METHOD FOR CLASSIFYING PARTICLES

[75] Inventors: Wallace H. Coulter, Miami Springs, Fla.; Marylou Ingram, La Canada, Calif.; Patrick Vincent Ferro, Miami Lakes, Fla.

[73] Assignee: Coulter Electronics, Inc., Hialeah, Fla.

[22] Filed: Oct. 14, 1971

[21] Appl. No.: 189,105

[52] U.S. Cl............... 324/71 CP, 324/58.5 A
[51] Int. Cl............... G01r 27/04, G01r 27/00
[58] Field of Search............ 324/58.5 A, 71 CP; 235/92 PC

[56] References Cited
UNITED STATES PATENTS

| | | | |
|---|---|---|---|
| 3,498,112 | 3/1970 | Howard | 324/58.5 A |
| 3,502,973 | 3/1970 | Coulter et al. | 235/92 PC |

Primary Examiner—Alfred E. Smith
Assistant Examiner—Ernest F. Karlsen
Attorney, Agent, or Firm—Silverman & Cass

[57] ABSTRACT

To enhance the selectivity of the electronic classification of particles which are to be sensed in an electronic field which includes a high frequency energization and which thereby employs the electronic opacity of the particles as a basis for their classification, the particles are treated, for example, by a lysing agent, which selectively causes the opacity of certain types of the particles to change; whereby, each distinctive type of particle acquires a distinctive opacity range that is subject to electronic detection. Further selectivity can be obtained by electronically excluding after the treatment and before classification any undesired opacity range.

22 Claims, 3 Drawing Figures

PATENTED SEP 17 1974　　3,836,849

Inventors
WALLACE H. COULTER
MARYLOU INGRAM
PATRICK VINCENT FERRO

BY

ATTYS.

METHOD FOR CLASSIFYING PARTICLES

BACKGROUND OF THE INVENTION

This invention relates to the determination or measurement of nonelectric properties of particles by the measurement of electric properties of the particles and, more particularly, to a method for increasing the selectivity of electronic apparatus operating upon principles taught in U.S. Pats. such as Nos. 2,656,508; 3,259,842; and 3,502,974, at least the latter of which is incorporated herein by reference.

Commercial equipment employing the teachings of the first two of the above cited patents are known throughout the world under the trademark COULTER COUNTER, and the principle of their operation is commonly known as the Coulter principle. Although disclosed in the above-mentioned U.S. Pats., Nos. 2,656,508 and 3,259,842, and in many papers appearing in scientific and industrial journals and books, it will be useful briefly to describe the Coulter principle and point out the limited use to which the same has been put in apparatus available until the advent of the invention disclosed and claimed in U.S. Pat. No. 3,502,974.

According to the Coulter principle, when a particle of microscopic size is passed through an electrical field of small dimensions of an order approaching those of the particle, there will be a momentary change in the electric impedance in the ambit of the field. If the field has a uniform region which is traversed by the particle, then the change due to the passage of the particle primarily will be a function of particle size for most biological and industrial particles.

In commercial apparatus constructed in accordance with said U.S. Pats., Nos. 2,656,508 and 3,259,842, field excitation has been supplied by means of unidirectional or low frequency sources. The changes referred to are limited to those which have a relationship with the particles causing said changes identified as based upon the size of the particles only. Such relationship has been found to be one of proportionality quite closely, that is to say, the electrical change caused by the passage of a particle through an electrical field of small dimensions excited by a direct or low frequency current is closely proportional to the size or volume of the particle.

Accordingly, in such commercial apparatus, particulate systems are passed through these fields in order to produce the electrical changes related to the impedance characteristics due to the different sizes of the particles, the changes are detected by some suitable means and used to operate counters and analyzers. The analyzers associated with such apparatus classify and size particles into populations, record the data obtained, etc.

As understood from the description above, the primary physical parameter of particles which affected the electrical changes produced each time one of the particles passed through the electric field was its size. This situation would obtain in the case of an electric field generated by a direct as well as a low frequency current source, since at low frequencies the reactances of capacitive changes are so large they are effectively short-circuited by the resistances involved.

As fully discussed in U.S. Pat. No. 3,502,974, the reactive effect of the particle, which is due to the difference in dielectric characteristics between the particle and suspending fluid would not be manifest until the field is subject to a high frequency energization. Such frequency has been determined to be in the range of so-called radio frequency, in most cases.

The invention of U.S. Pat. No. 3,502,974 differs from its prior art in that through its teachings the capabilities of the Coulter principle have been materially expanded to provide not only size information concerning particles being studied, but also information due to the composition and nature of the material constituting the particles. Accordingly, U.S. Pat. No. 3,502,974 discloses apparatus capable of distinguishing between particles of the identical size but made of different materials.

By generating the particle sensing field by means of both a low frequency or direct current and a radio frequency (r.f.) current excitation, two or more interrelated output signals can be derived from the passage of a single particle through the field in the ambit of the aperture. This comes about due to the fact that whereas the subject particles are nearly always insulators with respect to low frequency or d.c. fields, they are capable of carrying or impeding radio frequency current differently from the surrounding electrolyte. This may be due to differences in dielectric constant, in the case of hemogeneous particles, or to the sac-like structure of biological particles which have enclosed in an extremely thin membrane which has a correspondingly high capacitance per unit area contents of different conductivities than the electrolyte. Thus, while all the low frequency current goes around a particle, some of the radio frequency current will go through it. The ease with which the r.f. current will go through a particle is a measure of what is termed herein its "electrical transparency," or simply "transparency," in analogy with light transmission; whereas, a particle's ability to impede r.f. current is termed its "opacity."

The relative electrical opacity, or if you will, electrical transparency of a particle becomes an identifying feature of the particle contents; hence, its particle type for classification purposes. Accordingly, if three particles of equal size and different opacities were sensed in apparatus according to the teachings of U.S. Pat. No. 3,502,874, there would be detected three different output signals, whose differences were directly proportional to the different opacities.

To the extent that different types of particles each possesses a different opacity and the difference therebetween is detectable, the teachings of U.S. Pat. No. 3,502,974 would require no augmenting. However, this is not the situation. Some significantly different particles possess substantially the same opacity and cannot be classified effectively according to the teachings of the subject patent.

SUMMARY OF THE INVENTION

Accordingly, it is the primary object of this invention to enable, on the basis of opacity, the detection of particle types having substantially the same original or inherent opacity.

It is a further object of this invention to selectively change the opacity of particle types so that detectable differences are obtained.

It is a further object of this invention to chemically treat, as by lysing, particles, such as blood particles, to selectively alter their opacity.

Yet another object of this invention is to effectively remove from classifying consideration particles lying within any predetermined range of opacity.

To achieve the above and other objects of the invention and to overcome the deficiencies of the prior art, this invention provides a method whereby the particles, prior to passing into the ambit of the electronic field having both d.c. and r.f. energization, are treated to the extent that the opacity of at least one particle type is changed relative to the opacity of the other particle types. In a preferred form of the invention, the particles, such as blood cells, are chemically lysed to alter their internal impedance, such that red and white cells and/or different forms of the white cells acquire detectably different opacities.

Also provided by this invention is the method of excluding particles lying within any particular opacity range. In such method the amplitude of the opacity response curve for the selected opacity range is electronically removed from being received by the classifying equipment.

DESCRIPTION OF THE PREFERRED EMBODIMENTS

Figure 1:
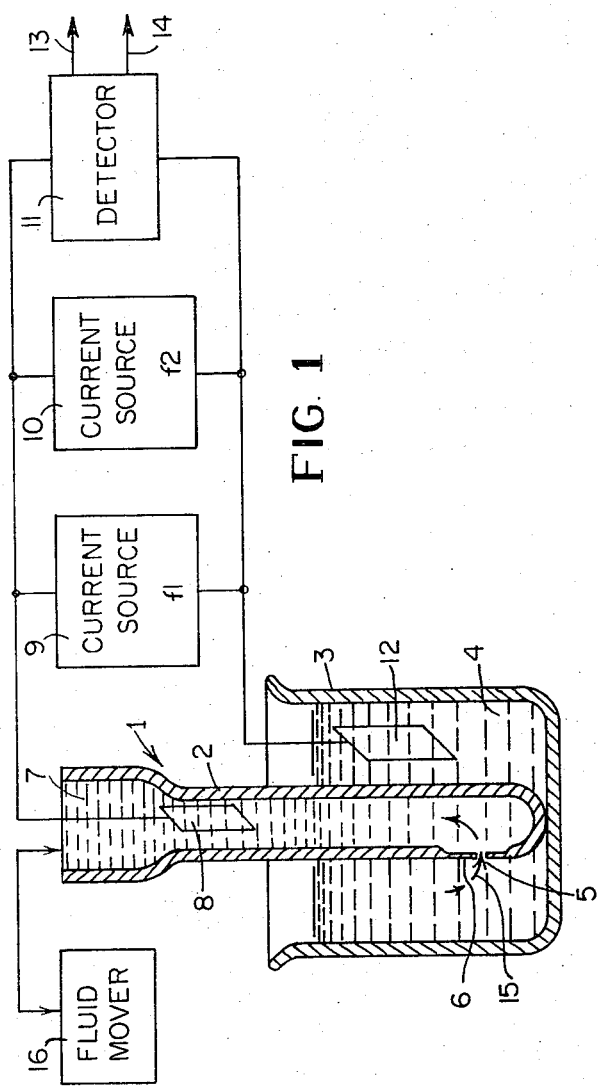
FIG. 1 is a diagrammatic view of apparatus constructed in accordance with the broad teachings of U.S. Pat. No. 3,502,974.

In FIG. 1, there is shown a preferred type of particle analyzing apparatus 1 which comprises an aperture tube 2 and a vessel 3 for holding a body of fluid 4 having particles suspended therein. The end of the tube 2 has a microscopic aperture 5 formed in an insulating wafer 6. A body of fluid 7 is in the interior of the tube 2, an electrode 8 is suspended therein and is connected to current sources 9 and 10, and to a detector structure 11. A common electrode 12 is suspended in the body of fluid 4 and is connected to the current sources 9 and 10 and the detector 11. The detector 11 possesses two parallel electronic channels having terminating lines 13 and 14 for connection to inputs of classifying means, not shown.

The fluid 4 and particles are caused to move through the aperture 5, as indicated by the broken line path 15 by reason of a fluid mover structure 16 that is connected with the aperture tube 2. The fluid mover structure 16 can conveniently comprise a manometer-syphon arrangement. For most purposes, the fluids 4 and 7 can be the same and comprise an electrolyte having an impedance different than that of the suspended particles.

The current source 9 can be a direct current source, designated f1, and the other current source 10 can be an r.f. source designated f2. In combination, they define a field which lies in and closely adjacent the aperture 5. Each time that a particle passes through the field, which can also be considered a sensing field, there will be a change in the impedance of the sensing field and there will be a component of the change which will be attributable to each frequency. These components are separated in the detector 11 and electrical pulses, which have their respective amplitudes dependent upon the changes caused by the particle at the particular frequency, are produced so as to appear on the channel terminals 13 and 14. Reference to direct current is not intended to exclude low frequency; likewise, r.f. encompasses frequencies high with respect to f1 and the particle response under consideration.

If, as discussed in U.S. Pat. No. 3,502,974, the particles possess reasonably different opacities, the detector will be able to differentiate one type of particle from another type. The detection can be on the basis that the opacity differences elicit any one or combinations of signal differences that can be detected, such as phase differences, amplitude differences, frequency differences, etc. However, if the particles do not possess detectably different opacities, then classification based upon this parameter is unattainable, at least in view of the prior art.

Figure 2:
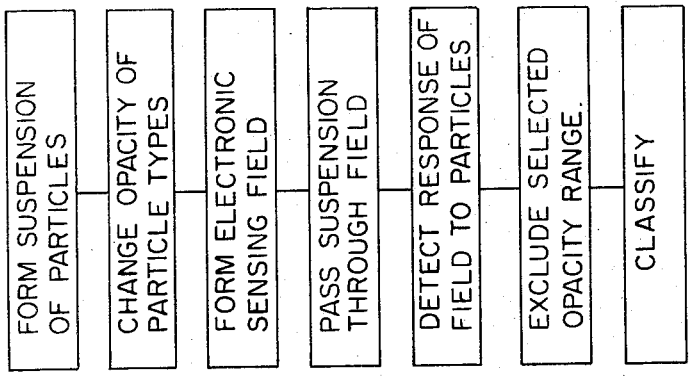
FIG. 2 is a flow chart of the subject method.

According to this invention and with reference to FIG. 2, before the particles are passed through the sensing field, they are subjected to a treatment whereby the opacity of at least one type of particle is altered by an amount that its resulting opacity is measurably different from the opacity of other particle types that are to be passed into the sensing field. Although FIG. 2 indicates that the change of opacity arises subsequent to the formation of the suspension of particles, such sequence is not necessarily critical, in that the particles, in many situations, can be treated before the suspension is formed. In fact, the treatment, if it is with a suitable fluid, could also encompass the formation of the suspension.

As a practical example, consider the classification of a suspension of red blood cells, white blood cells and polystyrene particles. Although red and white blood cells nominally have different sizes, their size ranges tend to overlap, or at least under certain conditions of health could overlap, such that classification based solely upon particle size would not provide an accurate analysis of these different particle types. Moreover, the opacities of these two types of blood cells also overlap; hence, the teachings of U.S. Pat. No. 3,502,974 could not be employed to is maximum efficiency without the use of the present invention. Polystyrene is included in this example, because it possesses a well defined opacity, significantly higher than that of the red and white blood cells and thereby can be used for control purposes. Stated somewhat analogously, the red and white blood cells inherently possess similar internal impedances, and polystyrene possesses a significantly different internal impedance. For purposes of this example, it will be assumed that all three types of particles are the same exact size, such that size will not contribute to the classification, detection, or sensing conditions.

One way of changing the opacity of a blood cell and similar types of particles is to change the nature of the contents of the cell, or change the contents per se. Such change or treatment, alters the particle opacity by altering its internal impedance and should be nondestructive, since particle analysis would be thwarted if the particles were to lose their discrete identity. One possible way of changing the nature of the particle's internal contents thereby to alter its impedance and opacity would be by irradiation, the form of which would depend upon the nature of the particle. Another way of changing the opacity of a particle would be by applying thereto an impedance changing substance. Such substance could be absorbed into the particle or effectively be injected into the particle. Although such treatment can involve chemical action and/or reaction, it also can involve other forms of action and/or reaction that directly operate upon the internal impedance of selected particle types.

One way to envision many types of particles is to consider a membrane encasing a body of contents. The particle is somewhat like a fluid-filled balloon, such that its membrane can be pricked to slowly let out the contents; or, it can be ruptured to destroy its form rapidly and lose its contents. If when pricked there is an exchange of the internal contents of the particle with the surrounding material; i.e., the fluid in which the particle is suspended, then the membrane can retain its initial form and size while its contents are being changed and while only the opacity of the particle is changed.

Although pricking or lysing of the membrane might be accomplished by some mechanical or electrical process, chemistry has to date offered the most acceptable solution, in the form of lysing agents. Lysing agents are well known in hematology for acting upon red blood cells to effectively break them up and release their internal contents, as in hemoglobin determinations.

According to the present invention, it has been discovered that the use of an appropriate minimum amount of a lysing agent will effectively prick and not rupture the cell membrane to enable fluid exchange. The amount of lysing agent, of course, depends upon the concentration of particles, the type of particles and various other environmental conditions. If the particles rupture or break up, then too much lysing agent has been employed.

Before going further, it is to be expressly noted that the term "lysing agent" is not herein limited to its hematology chemical forms or use, and that the specific example of blood cells is not to be considered limiting.

Specific chemical lysing agents which have proved successful fall within the group of detergents, plant alkaloids, and enzymes. Examples of each type are, respectively, hexacetyl-trimethylammonium bromide, hexatrimethylammonium chloride, other quarternary ammonium salts; saponin; and streptolysin-O.

If a suspension were known to contain only two types of particles having the same or overlapping opacities, then a single treatment to change the opacity of one particle type relative to the other would be sufficient for particle classification. For example, and with reference to FIG. 3, if, under the opacity curve Z, the area defined by vertical dot-dash lines encompassed by the bracket A + B were to represent the overlapping opacity range of red and white blood cells, then the addition of a suitable amount of saponin would cause a change in the opacity of the red cells to cause them to acquire a classifiably distinctive opacity range under the bracket A' and leave the white cells clearly classifiable in their opacity range B'. Even if the opacity range of the white cells were also to be shifted by the lysing agent, as to the range B'', analysis of the two particle types could be accomplished on the basis of their different resulting opacities. The opacity range C is to be representative of polystyrene particles.

Now, if more than two particle types were initially lying in the same opacity range and they were not differently affected by the same treating agent, then it might be necessary to employ more than one treating agent and in fact a combination of agents that encompassed more than lysing agents. For example, once the red cells were shifted to the range A' and the white cells were in the range B', it would be desirable to separate the lymphocytes from the remaining forms of white cells. Accordingly, by the additional treatment by means of a second opacity changing agent, the lymphocytes could be shifted to a new range, such as B''. Once the lymphocytes and red cells are separated, via opacity changes, from the remaining blood particles, it is possible for the forms of granulocytes and the monocytes to become distinguishable for classification and analysis.

Working examples from the above mentioned group of chemical lysing agents next follows. In each example, the liquid temperatures were ambient values, close to 26° C.

I

As a detergent, one form of quartenary ammonium salt is hexadecyltrimethylammonium bromide (Cetrimide) which was used at various pH levels in a citric acid-disodium phosphate buffered physiologic saline solution. A 1:50,000 dilution of whole blood was made in the buffered saline. The named detergent then was added and a timer started. The final concentration of the lysing detergent was 5mg/liter. The end point was marked by the disappearance of the red cell pattern from a CRT display, i.e., transparency.

| Buffered Saline pH | Time to RBC transparency (minutes) |
|---|---|
| 2.25 | 0.25 |
| 2.99 | 4.0 |
| 3.58 | 7.0 |
| 3.98 | 12.5 |
| 4.52 | 30.0 |

II

As a plant alkaloid, 250 $\mu$l of a 1% solution of saponin was added to 100 $\mu$l of whole blood suspended in phosphate buffered saline having a pH of 7.2. There resulted lysing of the red cells and a ratio plot of leukocytes was accomplished showing two distinct peaks.

III

As an enzyme, 0.5 ml of streptolysin-O was added to a solution containing 0.2 ml of a 1:500 suspension of red blood cells and 40 ml of physiologic saline buffered to various levels with citric acid-sodium phosphate buffers. When the RBC became transparent, no longer gave a ratio pattern, lysis was considered complete.

| Saline-buffer pH | Time to Lysis (minutes) |
|---|---|
| 3.0 | 0.5 |
| 3.45 | 0.5–0.6 |
| 4.95 | 0.5 |
| 6.4 | 4.5–5.0 |
| 7.5 | >5 |

Once the treatment step is accomplished and the electronic sensing field is formed, the latter according to the teachings of U.S. Pat. No. 3,052,974, then, as indicated in FIG. 2, the suspension is passed through the field and detected for classification purposes.

A further aspect of this invention is the step of excluding from consideration by the classifying means particles lying in any particular opacity range. For example and again with reference to FIG. 3, assume that the particles in range A' are to be excluded. As will be appreciated any range could be excluded; however, exclusion of range A' is easier to illustrate and describe herein.

Figure 3:
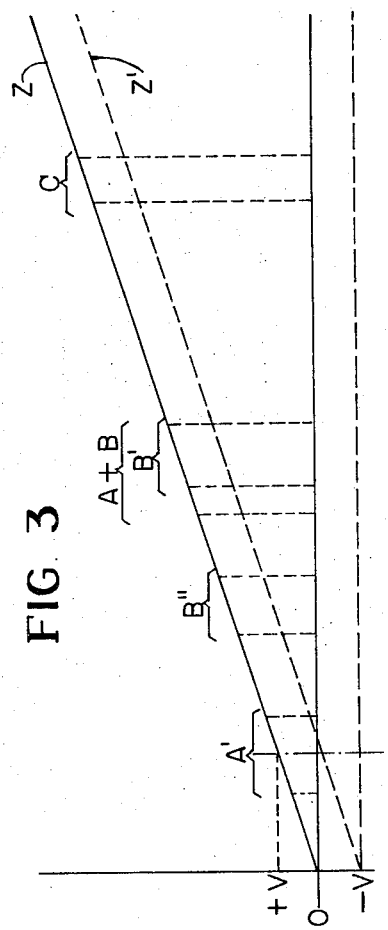
FIG. 3 is a chart illustrating an opacity response curve with selected opacity response ranges.

Pertinent to the exclusion of particles lying in an opacity range is the fact that there exists an opacity response curve, designated Z in FIG. 3. The precise shape and slope of this response curve and the factors that generate its form are not essential for the present discussion. Significant is the appreciation that, because of the electrical resistances and reactances involved in the opacity sensing and detecting, there develops a response curve Z, such that at different opacity ranges the voltage amplitudes of the response curve are different. Hence, if particles in a specific opacity range are to be excluded from classification, a suppression of the related voltage amplitude will accomplish this task.

As shown in FIG. 3, the midpoint of the range A' lies at the voltage +V. By generating an equal and opposite voltage level −V and applying it to the input of the classifying means, the response curve Z will be altered along its entire length to form a modified response curve Z'. As readily seen, the opacity range A' crosses the curve Z' along or at least very close to the zero voltage axis; hence, it is effectively excluded. Although the amplitudes of the other opacity ranges B'', A + B, B' and C are attenuated by the voltage value V, their classification will not be adversely affected.

If an opacity range other than one at an end of the curve Z were to be excluded, those below the range would become reversed in polarity due to the voltage subtraction process; otherwise, the forging discussion would apply.

If more than one range were to be excluded, this process could be repeated sequentially for each undesired opacity range of particles.

It is believed that the hereinabove presentation will enable those skilled in the art of electronic particle analysis and particularly those knowledgeable in the Coulter principle to appreciate the full scope of this invention and practice its teachings.

What is sought to be protected and claimed by U.S. letters Pat. is:

1. In a method for the electronic classification of different types of particles such classification having as one basis the detection of the electronic opacity of the particles, the steps of: subjecting all of the particles to treating means which selectively acts nondestructively upon said different types of particles by significantly changing the electronic opacity of at least one of the particle types, electronically sensing at least the opacity of each particle in an electronic field that includes a high frequency energization, and detecting the electrical result of said sensing in a manner which enables the classification of said particles.

2. A method according to claim 1 in which said subjecting to treating means alters the impedance of at least said one particle type.

3. A method according to claim 1 in which said subjecting to treating means alters the internal impedance of said one particle type to a greater extent than said subjecting alters the impedance of another of the particle types.

4. A method according to claim 3 in which said treating means causes a chemical reaction with said particle types whereby their internal impedances are selectively altered.

5. A method according to claim 1 in which said detecting includes the electronic exclusion of particles whose opacity falls within at least one defined range.

6. A method according to claim 5 in which said exclusion is in an opacity range of particles the opacity of which was significantly changed by said treating means.

7. A method according to claim 1 in which said treating means causes a chemical reaction with at least said one particle type to change is opacity.

8. A method according to claim 7 in which at least said one particle type possesses internal contents which, by said chemical reaction is removed, at least partially.

9. A method according to claim 1 in which said treating means comprises a lysing agent.

10. A method according to claim 9 in which said lysing agent is selected from the group of those detergents, plant alkaloids, and enzymes which are capable of functioning as lysing agents.

11. A method according to claim 10 in which the detergent is a quarternary ammonium salt which is capable of functioning as a lysing agent.

12. A method according to claim 11 in which said quarternary ammonium salt is selected from the group of hexacytyltrimethylammonium bromide, hexatrimethylammonium chloride, and hexadecyltrimethylammonium bromide.

13. A method according to claim 10 in which the plant alkaloid is a saponin.

14. A method according to claim 10 in which the enzyme is streptolysin-O.

15. A method according to claim 10 in which at least said one particle type is found in whole blood.

16. A method according to claim 1 in which at least said one particle type is found in whole blood and said treating means comprises a lysing agent.

17. A method according to claim 16 in which said blood particles possess internal contents and said lysing agent is employed to the extent that the particles are caused to lose at least some of their internal contents, but the particles otherwise remain intact.

18. A method according to claim 17 which further comprises the step of creating a suspension of the particles in a fluid having an impedance different from the impedance of the internal contents of the particles; whereby, when said internal contents are lost, said contents are replaced by said fluid to effect a detectable change in the impedance of the internal contents of the particles.

19. A method according to claim 18 in which said detecting includes the electronic exclusion of particles whose opacity falls within at least one defined range.

20. A method according to claim 19 in which said exclusion is in an opacity range of particles the opacity of which was significantly changed by said treating means.

21. A method according to claim 19 in which said exclusion is accomplished by subtracting from said electrical result of said sensing of all particles an electrical value equal to the electrical value of the opacity response attributable to the defined opacity range.

22. A method according to claim 21 in which said lysing agent causes a chemical reaction to attain the lysing result.

* * * * *